(12) United States Patent
Zabelin

(10) Patent No.: US 8,776,765 B2
(45) Date of Patent: *Jul. 15, 2014

(54) INTERNAL COMBUSTION ENGINE EFFICIENCY

(71) Applicant: Pavel Zabelin, New York, NY (US)

(72) Inventor: Pavel Zabelin, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/741,808

(22) Filed: Jan. 15, 2013

(65) Prior Publication Data

US 2014/0060462 A1    Mar. 6, 2014

Related U.S. Application Data

(62) Division of application No. 13/597,540, filed on Aug. 29, 2012.

(51) Int. Cl.
F02M 27/00 (2006.01)
F02B 77/04 (2006.01)
F02B 47/00 (2006.01)

(52) U.S. Cl.
CPC .............. F02B 77/04 (2013.01); F02B 47/00 (2013.01)
USPC .......................................... 123/539

(58) Field of Classification Search
USPC ............. 123/536–539, 196 R, 196 M, 3, 549, 123/556; 422/186.04–186.08
See application file for complete search history.

(56) References Cited

U.S. PATENT DOCUMENTS

| 1,873,746 | A * | 8/1932 | English | 123/539 |
| 6,990,965 | B2 * | 1/2006 | Varasundharosoth et al. | 123/539 |
| 7,341,049 | B2 * | 3/2008 | Clack | 123/539 |
| 2009/0050116 | A1 * | 2/2009 | Cummings | 123/538 |
| 2009/0095266 | A1 * | 4/2009 | Burmenko | 123/537 |
| 2013/0112157 | A1 * | 5/2013 | Brown | 123/3 |

* cited by examiner

Primary Examiner — Hung Q Nguyen

(57) ABSTRACT

The technique disclosed increases the energy conversion efficiency by means of substantial reduction of friction between the cylinder walls and the associated piston rings. The result is achieved by eliminating the unwanted carbonaceous deposits on cylinder walls and associated piston rings by means of vapor nitric acid (HNO3) delivered to the combustion chambers of an engine. Nitric acid is produced by means of chemical reaction between oxygen (O2) and water vapor (H2O) in air and nitric dioxide (NO2) generated throughout an electrical discharge in the air intake path.

14 Claims, 2 Drawing Sheets

INTERNAL COMBUSTION ENGINE EFFICIENCY

REFERENCE TO RELATED APPLICATION

This application is a division of U.S. patent application Ser. No. 13/597,540, filed Aug. 29, 2012, the disclosure of which is incorporated herein by reference.

BACKGROUND OF THE INVENTION

Friction between a cylinder walls and the associated piston rings is substantial and detracts from the energy conversion efficiency of an internal combustion engine.

For reasons of pollution and possible greenhouse effect, it is of major importance to increase the energy conversion efficiency of the internal combustion engine so as to increase the amount of mechanical work that can be provided per unit of fuel. A higher energy conversion efficiency means reduced fuel consumption and reduced cost of operating the engine.

Accordingly, it is a major purpose of this invention to provide a technique for increasing the energy conversion efficiency of an internal combustion engine by reducing the mechanical energy spent on overcoming the friction between cylinder walls and the associated piston rings.

It is a related purpose of this invention to provide this reduction at a cost which provides a net economic gain in engine operation.

It is another purpose of this invention to achieve the above purposes in a device that can be easily retrofitted into existing vehicles and other machinery without making changes to the internal combustion engine with which it is used.

A further result of achieving the above purposes is to reduce the wear on the cylinder walls and piston rings thereby extending the operating life of the piston rings and cylinder walls.

The problem of reducing the friction between cylinder walls and associated piston rings has been tackled by developing specially designed friction-reducing coating materials and methods for covering an outer surface of the piston rings and cylinder walls with these materials, developing modified formulas for motor oil, additives to motor oil and to fuel claiming to reduce the friction, and designing new modifications and models of piston rings and cylinder walls themselves.

BRIEF DESCRIPTION

A significant amount of mechanical energy generated during the combustion process is spent on overcoming the friction between the cylinder walls and the associated piston rings.

It is carbonaceous deposits on the cylinder walls and on the outer surface of piston rings that increase friction. They mainly consist of polycrystalline carbon, serving as a "skeleton", and hydrocarbons.

The reduction of friction between cylinder walls and the associated piston rings takes place by generating or delivering NO2 (nitrogen dioxide) into the air intake path where the NO2 reacts with the water vapor (H2O) and oxygen (O2) in the intake air to provide vapors of HNO3 (nitric acid). The NO2 is produced in the method by means of electric discharge in air generated by means of a high voltage generator (HV generator) having at its output an impulse, sinusoid or linear signal. During the intake and compression strokes, this HNO3 reacts with the carbonaceous deposits on the cylinder walls and piston rings to form products which are exhausted.

Due to dissociation of the active chemicals at high temperature in the power stroke, there is no significant chemical reaction with carbonaceous deposits in the power stroke.

In one embodiment, a pair of electrodes connected to the output of an HV (high voltage) generator are positioned in the air intake path and provide the electrical discharge in the air which generates NO2.

Power for the HV generator may be obtained from a DC (direct current) power supply to which the HV generator may be connected. The HV generator provides an appropriate high voltage that when applied to the electrodes cause the required atmospheric discharge producing NO2.

The amount of NO2 required for this purpose is fairly small particularly if the operation of the HV generator is continuous during an internal combustion engine operation.

In one embodiment, the HV generator placed together with the electrodes are mounted in a box having openings in its sidewalls. The box is a convenient item for quickly and inexpensively mounting the device in the air intake path of the internal combustion engine, preferably downstream from an air filter.

The result is a substantial reduction in friction between a cylinder wall and the associated piston rings resulting in reduction of the mechanical energy spent on overcoming the friction and increasing the energy conversion efficiency of the internal combustion engine.

DETAILED DESCRIPTION

Figure 1:
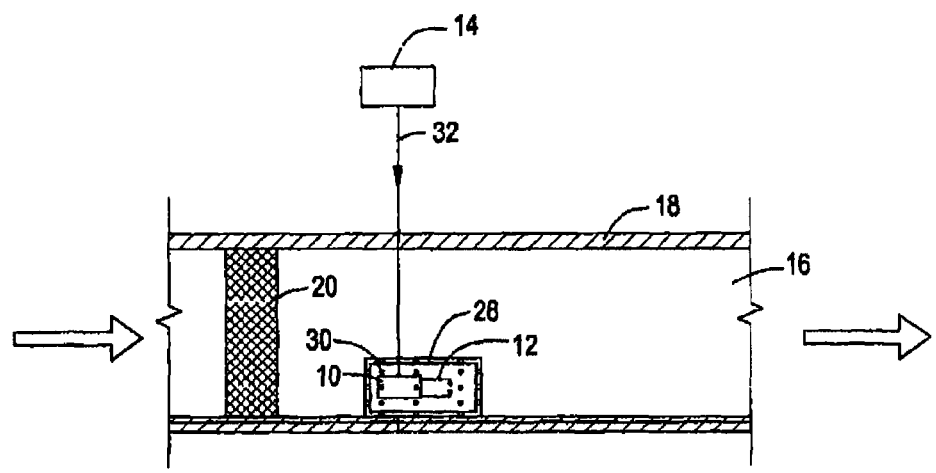
FIG. 1 is a schematic showing of an embodiment of this invention in which the HV generator and discharge electrodes 12 are mounted together in a box 28 having openings 30. The HV generator 10 is connected to DC power supply 14. The box 28 is mounted in the air intake path 16 of the engine downstream from an air filter 20.
Figure 2:
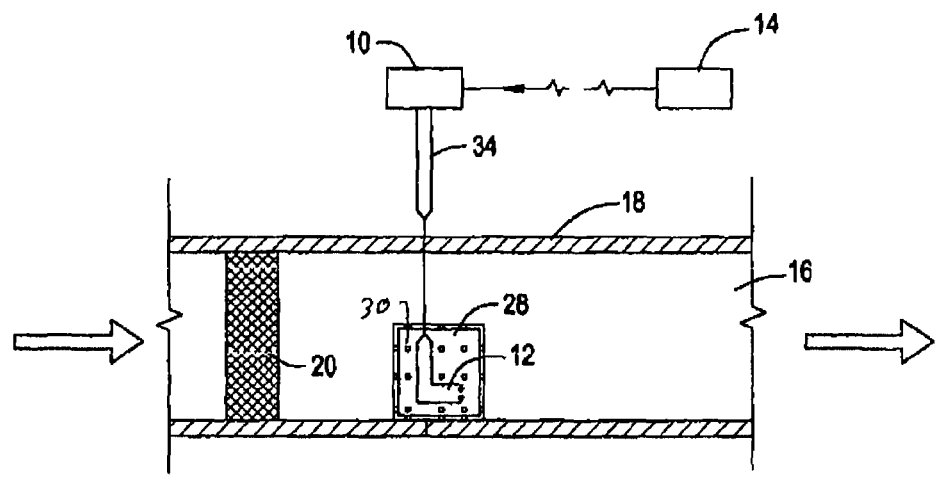
FIG. 2 is a schematic of a second embodiment in which the HV generator 10 is mounted outside the air intake pipe 18; the electrodes 12 remaining in the air intake path 16.

As shown in the two embodiments illustrated in FIGS. 1 and 2, this invention employs an HV generator 10 to provide an electrical discharge at electrodes 12. The power input to the HV generator 10 can be from a 12 volt DC power supply 14.

This electrical discharge generates nitrogen dioxide NO2 in accordance with the chemical equation: $N_2 + 2O_2 = 2NO_2$. The electrodes 12 are placed in the air intake path 16 of an internal combustion engine and are located within the inlet pipe 18 downstream from an air filter 20. The NO2 reacts with the oxygen and water vapor in the air intake path 16 to form vapor of nitric acid HNO3 in accordance with chemical equation: $4NO_2 + O_2 + 2H_2O = 4HNO_3$.

Figure 3:
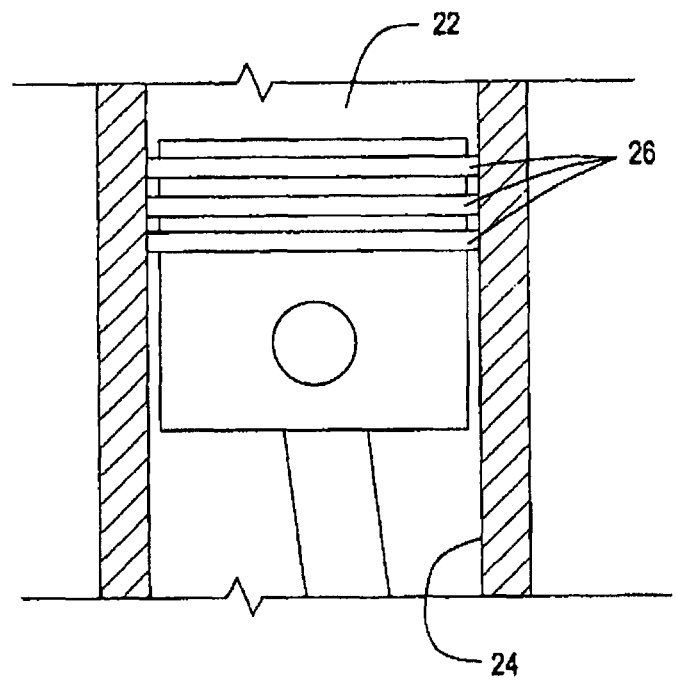
FIG. 3 is a schematic showing of a combustion chamber 22, cylinder wall 24 and the associated piston and piston rings 26.

Within the combustion chamber 22 (see FIG. 3), during the intake and compression strokes, the HNO3 vapor reacts with the polycrystalline carbon of carbonaceous deposited on each cylinder wall 24 and on the piston rings 26 in accordance with the chemical equation: $3C + 4HNO_3 = 3CO_2 + 4NO + 2H_2$. The reaction results in gaseous products, which are exhausted from the engine. During intake and compression strokes, hydrocarbons of carbonaceous deposits are also eliminated through a process of nitration by the nitric acid.

NO2 production in the air intake path 16 is continuous while the engine is operating.

The DC power supply 14 is preferably a power supply which operates only when the engine operates.

The HV generator 10 and electrodes 12 can be mounted together on a platform such as the box 28 having openings 30. This makes it convenient to mount the device in the air intake path 16 of most types of internal combustion engines. The openings should be on all six walls of the box 28 and should be sufficient in number and size. But no matter where mounted, the device of this invention operates without requiring a change in the design of the associated internal combustion engine.

Electric leads pass through the wall of the pipe 18 that defines the air intake path 16. As shown in FIG. 1, these leads 32 may be from a DC power supply 14 outside the air intake pipe 18. Or, as shown in FIG. 2, the leads 34 may be from an HV generator 10 mounted outside the pipe 18 to electrodes 12 situated inside the box 28 with openings 30. Leads 32 or 34 can readily be assembled with the pipe 18 by passing through one of the junctions between segments of the pipe 28.

It has been found that there is sufficient concentration of water vapor in any ambient air to provide the level necessary for the generation of the required nitric acid (HNO3).

Experiments reveal that the amount of nitric acid needed to eliminate the carbonaceous deposits is small. Thus the amount of NO2 that needs to be generated is also small. Accordingly, the simplest, least expensive and safest way to provide the NO2 is by an electric discharge in air. Experiments show that an electric HV generator consuming 10 to 12 watts produces enough NO2 to dissolve deposits in an engine installed on a typical family or SUV car.

In one tested embodiment, the HV generator 10 used produced a voltage of 10 kV at a frequency of 500 Hz. The electrodes 12 had an electrode gap of 5 mm. These parameters can be varied over a wide range to provide a preferred operating system for the particular engine to which the invention is adapted.

Two embodiments of this invention have been described. There are variations and other embodiments which can be made of the invention, particularly to adapt the invention to a wide range of internal combustion engines.

For example, the FIG. 1 embodiment described employs a box 28, with openings 30, to hold the HV generator 10. The box 28 makes it convenient to mount the invention in the air intake path 16 of the engine. But if the size or location of the air intake path makes that mounting inconvenient or if the engine is very powerful and a powerful HV generator is needed, the HV generator 10 can be mounted outside the air intake pipe 18, as shown in FIG. 2. In this design, the electrodes 12 are mounted inside the air intake pipe in the box with openings. The electrodes 12 are connected to the HV generator 10 by electric wires 34. A simple platform could be used instead of the box. But for safety reasons a box with openings or equivalent is used in preferred embodiments.

A control device (not shown) can be used to permit an operator (a driver for example) to keep remote control over the HV generator functioning.

The HV generator can either be a dedicated generator powered from a DC power supply or can be one of the sources of the high voltage that are generated when an engine is operating.

The embodiments disclosed employ two distinct electrodes 12. However, as used herein, the term electrodes is to be understood to include a design where a single distinct electrode is employed in case HV generator produces a linear signal at an output.

It should be noted that the invention is not directed to improve the combustion process. The invention reduces friction between a cylinder wall 24 and the associated piston rings 26.

The invention is applicable to many types and kinds of internal combustion engines; including, but not limited to, two-stroke engine, four-stroke engine, six-stroke engine, diesel engine, Atkinson cycle engine, Miller cycle engine, diesel engine, engine without connecting rod, functioning individually or being part of types and kinds of more complex civil or military engines or machines (including, but not limited to, hybrid and plug-in engines, electricity generators, refrigerators, air-conditioners, evaporators, pumps), installed in civil or military types and kinds of moving, flying, floating and moving under water machines, apparatus and devices (including, but not limited to, vehicles, locomotives, boats, planes, helicopters, submarines).

The invention is applicable to internal combustion engines having a wide range of output power and torque and consuming many types and kinds of fuel including, but not limited to, gasoline, diesel fuel, biofuels, ethanol, biodiesel, petroleum gas, propane, natural gas, charcoal gas and wood gas.

What is claimed is:

1. A method of increasing efficient operation of an internal combustion engine by reducing friction between cylinder walls and associated piston rings, wherein the engine has an air intake path for introducing air into combustion chambers, wherein a High Voltage (HV) generator is mounted to a box, the method comprising the steps of:

generating, by the HV generator, nitrogen dioxide (NO2) by an electrical discharge; and introducing said NO2 into the air intake path, whereby the chemical reaction between NO2, oxygen of air, and water vapor in air provides reactant HNO3 which chemically dissolves the carbonaceous deposits that substantially contribute to the friction between the cylinder walls and associated piston rings.

2. A method of increasing efficient operation of an internal combustion engine by reducing friction between cylinder walls and associated piston rings, wherein the engine has an air intake path for introducing air into combustion chambers, the method comprising:

supplying, by a High Voltage (HV) generator, a voltage to produce an electrical discharge within the air intake path;

generating nitrogen dioxide (NO2) by the electrical discharge; and introducing said NO2 into the air intake path, wherein the chemical reaction between NO2, oxygen of air, and water vapor in air provides reactant HNO3 which chemically dissolves the carbonaceous deposits that substantially contribute to the friction between the cylinder walls and associated piston rings.

3. The method of claim 2, wherein said steps of generating and introducing are continuous during operation of the associated internal combustion engine.

4. The method of claim 2, wherein the electrical discharge generates NO2 in accordance with the chemical equation N2+2O2=2NO2.

5. The method of claim 2, wherein the NO2 reacts with the oxygen and water vapor in the air intake path to form vapor of nitric acid HNO3 in accordance with chemical equation 4NO2+O2+2H2O=4HNO3.

6. The method of claim 2, wherein the electrical discharge generates NO2 in accordance with the chemical equation N2+2O2=2NO2, and wherein the NO2 reacts with the oxygen and water vapor in the air intake path to form vapor of nitric acid HNO3 in accordance with chemical equation 4NO2+O2+2H2O=4HNO3.

7. The method of claim 2, wherein the vapor of nitric acid reacts with polycrystalline carbon of the carbonaceous deposits on each of the cylinder walls and on the piston rings in accordance with the chemical equation 3C+4HNO3=3CO2+4N0+2H2.

8. The method of claim 2, wherein the electrical discharge generates NO2 in accordance with the chemical equation N2+2O2=2NO2, wherein the NO2 reacts with the oxygen and water vapor in the air intake path to form vapor of nitric acid HNO3 in accordance with chemical equation 4NO2+O2+2H2O=4HNO3, and wherein the vapor of nitric acid HNO3 reacts with polycrystalline carbon of carbonaceous deposits on each of the cylinder walls and on the piston rings in accordance with the chemical equation 3C+4HNO3=3CO2+4N0+2H2.

9. The method of claim 4, wherein the HV generator is mounted to a box.

10. The method of claim 9, wherein the box further includes a plurality of electrodes.

11. The method of claim 10, wherein the box is mounted to the air intake path.

12. The method of claim 11, wherein the box further includes a plurality of openings.

13. The method of claim 12, wherein the plurality of openings includes openings on a plurality of sides.

14. The method of claim 13, wherein the box includes six sides, and wherein the plurality of openings includes at least one opening on each of the six sides.

* * * * *

UNITED STATES PATENT AND TRADEMARK OFFICE
CERTIFICATE OF CORRECTION

PATENT NO. : 8,776,765 B2  
APPLICATION NO. : 13/741808  
DATED : July 15, 2014  
INVENTOR(S) : Pavel Zabelin Page 1 of 1

It is certified that error appears in the above-identified patent and that said Letters Patent is hereby corrected as shown below:

On the Title Page

Below "Primary Examiner - Hung Q Nguyen"

Item (74) Add "Attorney, Agent or Firm - Cowan, Liebowitz & Latman, P.C.; Mark Montague, Esq.; Serge Krimnus, Esq."

Signed and Sealed this  
Ninth Day of September, 2014

Michelle K. Lee  
*Deputy Director of the United States Patent and Trademark Office*